(12) United States Patent
Kiilerich Pratas et al.

(10) Patent No.: US 12,727,054 B2
(45) Date of Patent: Sep. 1, 2026

(54) METHOD, APPARATUS AND COMPUTER PROGRAM

(71) Applicant: NOKIA TECHNOLOGIES OY, Espoo (FI)

(72) Inventors: Nuno Manuel Kiilerich Pratas, Gistrup (DK); Vinh Van Phan, Oulu (FI); Ling Yu, Kauniainen (FI); Prajwal Keshavamurthy, Munich (DE)

(73) Assignee: Nokia Technologies Oy, Espoo (FI)

( * ) Notice: Subject to any disclaimer, the term of this patent is extended or adjusted under 35 U.S.C. 154(b) by 484 days.

(21) Appl. No.: 18/052,191

(22) Filed: Nov. 2, 2022

(65) Prior Publication Data

US 2023/0134789 A1 May 4, 2023

(30) Foreign Application Priority Data

Nov. 2, 2021 (EP) .................................... 21205902

(51) Int. Cl.
*H04W 76/28* (2018.01)
*H04W 76/15* (2018.01)

(52) U.S. Cl.
CPC ........... *H04W 76/28* (2018.02); *H04W 76/15* (2018.02)

(58) Field of Classification Search
CPC .............................. H04W 76/28; H04W 76/15
See application file for complete search history.

(56) References Cited

U.S. PATENT DOCUMENTS

2022/0191793 A1* 6/2022 Murray et al. .... H04W 52/0232
2022/0312398 A1* 9/2022 Liu ...................... H04W 72/20

(Continued)

FOREIGN PATENT DOCUMENTS

CN 113225841 A 8/2021
CN 115769638 A * 3/2023 ........ H04W 52/0216

(Continued)

OTHER PUBLICATIONS

3GPP RAN WG2 Meeting #115 electronic, R2-2107271; "DRX Configuration Determination in Unicast"; Agenda Item: 8.15.2; Source: Inter Digital Inc.; Online; Aug. 2021; 3 pages (Year: 2021).*

(Continued)

*Primary Examiner* — Hassan A Phillips
(74) *Attorney, Agent, or Firm* — Brake Hughes Bellermann LLP

(57) ABSTRACT

There is provided a first apparatus for a first terminal, wherein the first terminal has a unicast link established with a second terminal. The first apparatus includes at least one processor, and at least one memory including computer program code, the at least one memory and the computer program code configured to, with the at least one processor, cause the first apparatus at least to: receive, from the second terminal, assistance information for a preferred discontinuous reception, DRX, configuration for the second terminal; determine a DRX configuration for the second terminal using: the received assistance information, and other information acquired by the first terminal related to DRX operations of terminals other than the second terminal; and provide, to the second terminal, the determined DRX configuration for the second terminal to be applied on the unicast link between the first and second terminals.

11 Claims, 11 Drawing Sheets

(56) References Cited

U.S. PATENT DOCUMENTS

| | | | | |
|---|---|---|---|---|
| 2023/0053975 | A1* | 2/2023 | Wang | H04W 76/14 |
| 2023/0072971 | A1* | 3/2023 | Ryu | H04W 52/0216 |
| 2023/0122562 | A1* | 4/2023 | Wang | H04W 72/23 370/311 |
| 2023/0380005 | A1* | 11/2023 | Ko et al. | H04W 76/28 |
| 2024/0073907 | A1* | 2/2024 | Hu | H04W 72/21 |
| 2024/0172235 | A1* | 5/2024 | Pan | H04W 72/02 |
| 2024/0292378 | A1* | 8/2024 | Khoryaev et al. | H04W 72/40 |

FOREIGN PATENT DOCUMENTS

| | | | | |
|---|---|---|---|---|
| GB | 202104730 | | 5/2021 | |
| JP | 2023515745 A | * | 4/2023 | H04W 76/28 |
| WO | 2021147011 A1 | | 7/2021 | |

OTHER PUBLICATIONS

European Search Report for Application No. 21205902.6 mailed on Apr. 28, 2022, 11 pages.

3GPP RAN WG2 Meeting #115 electronic, R2-2107271; "DRX Configuration Determination in Unicast"; Agenda Item: 8.15.2; Source: InterDigital Inc.; Online; Aug. 2021; 3 pages.

3GPP TSG-RAN WG2 Meeting #113-e, R2-2101762; "Consideratoin on the Sidelink DRX for Unicast"; Agenda Item: 8.15.2.2; Source: Huawei, HiSilicon; Online; Jan. 25-Feb. 5, 2021; 6 pages.

E3GPP TSG-RAN WG2 Meeting #113bis e, R2-2103615; "Discussion on Sidelink DRX"; Agenda Item: 8.15.2; Source: Sony; Online; Apr. 12-20, 2021; 6 pages.

3GPP TSG-RAN WG2 Meeting #114-e, R2-2105131; "Discussion on RX-centric and Tx-centric in SL Unicast DRX"; Agenda Item: 8.15.2; Source: Apple, InterDigital Inc.; Online; May 19-27, 2021; 5 pages.

Communication pursuant to Article 94(3) EPC for European Patent Application No. 21205902.6, mailed on Jun. 3, 2025, 6 pages.

Office Action and Search Report for Chinese Patent Application No. 202211356678.4, mailed on Dec. 3, 2025, 12 pages.

Office Action for Chinese Patent Application No. 2022113566784, mailed on Apr. 18, 2026, 12 pages.

* cited by examiner

Key:
601
603
605
607
609
611
Time

METHOD, APPARATUS AND COMPUTER PROGRAM

CROSS-REFERENCE TO RELATED APPLICATIONS

This application claims priority to European Patent Application No. 21205902.6, filed Nov. 2, 2021, entitled "METHOD, APPARATUS AND COMPUTER PROGRAM", the disclosure of which is hereby incorporated by reference herein in its entirety.

FIELD

The present application relates to a method, apparatus, and computer program for a wireless communication system.

BACKGROUND

A communication system may be a facility that enables communication sessions between two or more entities such as user terminals, base stations/access points and/or other nodes by providing carriers between the various entities involved in the communications path. A communication system may be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided a first apparatus for a first terminal, wherein the first terminal has a unicast link established with a second terminal, the first apparatus comprising means configured to perform: receiving, from the second terminal, assistance information for a preferred discontinuous reception, DRX, configuration for the second terminal; determining a DRX configuration for the second terminal using: the received assistance information, and other information acquired by the first terminal related to DRX operations of terminals other than the second terminal; and providing, to the second terminal, the determined DRX configuration for the second terminal to be applied on the unicast link between the first and second terminals.

In an example, the means are configured to perform: using the determined DRX configuration for unicast communications with the second terminal.

In an example, the acquired other information comprises: information about a first DRX configuration that is configured for use by one of: the first terminal, and a further terminal in the vicinity of the first terminal, wherein first DRX configuration has a first DRX ON duration.

In an example, the first DRX configuration is associated with a cast type, the cast type comprising one of: unicast, groupcast, and broadcast.

In an example, when the cast type of the first DRX configuration is broadcast or groupcast: the other information is acquired via received system information block signalling when the first terminal is in-network coverage, and the other information is acquired via pre-configuration of the first terminal when the second terminal is out-of-network coverage.

In an example, the means are configured to perform: observing activity of a resource pool associated with the first DRX configuration in order to determine whether the first DRX configuration is in use.

In an example, the observing comprises measuring and assigning a congestion level to the first DRX ON duration of the first DRX configuration based on the observed activity of the resource pool.

In an example, the observed activity comprises one of: an energy measurement of the resource pool, and a decoding of sidelink control information associated with the first DRX ON duration.

In an example, the means are configured to perform: comparing the congestion level of the first DRX ON duration of the first DRX configuration to a threshold value; and in response to determining that the congestion level of the first DRX ON duration of the first DRX configuration is above the threshold value, identifying the first DRX ON duration of the first DRX configuration as congested.

In an example, the means are configured to perform: in response to determining that the first DRX ON duration of the first DRX configuration is congested, determining whether a preferred DRX ON duration of the preferred DRX configuration coincides with the first ON duration; and in response to determining that they do not coincide, selecting the preferred DRX configuration as the DRX configuration for the second terminal.

In an example, the means are configured to perform: in response to determining that they do coincide, determining a DRX configuration different to the preferred DRX configuration based on the acquired information.

In an example, the DRX configuration different to the preferred DRX configuration is determined to avoid congested periods by other DRX ON periods. The other DRX ON periods may be from other devices and cast types (e.g., groupcast/broadcast).

In an example, the means are configured to perform: in response to determining that they do coincide and the first DRX ON duration is congested, comparing the congestion level of the first DRX ON duration of the first DRX configuration to a tolerance threshold value; in response to determining that the first DRX ON duration of the first DRX configuration is below the threshold, selecting the preferred DRX configuration as the DRX configuration for the second terminal.

In an example, the first DRX configuration comprises a plurality of different DRX configurations that are each configured for use by one of: the first terminal, and a further terminal in the vicinity of the first terminal, wherein each of the plurality of different DRX configurations have a respective DRX ON duration.

In an example, the means are configured to perform: in response to determining that i) each of the plurality of different DRX configurations coincide with the preferred DRX configuration and ii) that each of the respective DRX ON durations are congested, incrementing the threshold value by a step value; and comparing the congestion level of each of the respective DRX ON durations to the incremented threshold value, to determine a suitable DRX ON period, of the plurality of different DRX configurations, that has a congestion level below the incremented threshold value.

According to an aspect, there is provided a second apparatus for a second terminal, wherein the second terminal has a unicast link established with a first terminal, the second apparatus comprising means configured to perform: determining a preferred DRX configuration for the second terminal using DRX information acquired by the second terminal; providing assistance information indicating the determined DRX configuration to the first terminal; and receiving, from the first terminal, a DRX configuration for the second terminal to be applied on the unicast link between the first and second terminals.

In an example, the means are configured to perform: using the received DRX configuration for unicast communications with the first terminal.

In an example, the acquired DRX information comprises: information about a second DRX configuration that is configured for use by one of: the second terminal, and a further terminal in the vicinity of the second terminal, wherein second DRX configuration has a second DRX ON duration.

In an example, the second DRX configuration is associated with a cast type, the cast type comprising one of: unicast, groupcast, and broadcast.

In an example, when the cast type of the second DRX configuration is broadcast or groupcast: the DRX information is acquired by received system information block signalling when the second terminal is in-network coverage, and the DRX information is acquired by a pre-configuration of the second terminal when the second terminal is out-of-network coverage.

In an example, the means are configured to perform: observing activity of a resource pool associated with the second DRX configuration in order to determine whether the second DRX configuration is in use.

In an example, the observing comprises: measuring and assigning a congestion level to the second DRX ON duration of the second DRX configuration based on the observed activity of the resource pool.

In an example, the means are configured to perform: comparing the congestion level of the second DRX ON duration of the second DRX configuration to a threshold value; and when the congestion level of the second DRX ON duration of the second DRX configuration is below the threshold value, identifying the second DRX ON duration as a suitable DRX ON duration for the preferred DRX configuration.

In an example, the second DRX configuration comprises a plurality of different DRX configurations, wherein the means are configured to perform: comparing the congestion level of each respective DRX ON durations of the plurality of different DRX configurations to a threshold value; and when the congestion level of one or more of the respective DRX ON duration of the plurality of different DRX configurations is below the threshold value, identifying the one or more respective DRX ON durations as suitable DRX active periods for the preferred DRX configuration.

In an example, the congestion level of all of the respective DRX ON durations of the plurality of different DRX configurations is above the threshold, incrementing the threshold value by a step value; and comparing the congestion level of each respective DRX ON duration of the plurality of different DRX configurations to the incremented threshold value, to determine a suitable DRX ON period, of the plurality of different DRX configurations, that has a congestion level below the incremented threshold value.

In an example, the means are configured to perform: identifying a plurality of preferred DRX configurations, wherein assistance information for each of the plurality of preferred DRX configurations is provided to the first terminal, in order of preference.

According to an aspect, there is provided a method performed by a first terminal, the method comprising: receiving, from a second terminal, assistance information for a preferred discontinuous reception, DRX, configuration for the second terminal; determining a DRX configuration for the second terminal using: the received assistance information, and other information acquired by the first terminal related to DRX operations of terminals other than the second terminal; and providing, to the second terminal, the determined DRX configuration for the second terminal to be applied on a unicast link between the first and second terminals.

In an example, the method comprises: using the determined DRX configuration for unicast communications with the second terminal.

In an example, the acquired other information comprises: information about a first DRX configuration that is configured for use by one of: the first terminal, and a further terminal in the vicinity of the first terminal, wherein first DRX configuration has a first DRX ON duration.

In an example, the first DRX configuration is associated with a cast type, the cast type comprising one of: unicast, groupcast, and broadcast.

In an example, when the cast type of the first DRX configuration is broadcast or groupcast: the other information is acquired via received system information block signalling when the first terminal is in-network coverage, and the other information is acquired via pre-configuration of the first terminal when the second terminal is out-of-network coverage.

In an example, the method comprises: observing activity of a resource pool associated with the first DRX configuration in order to determine whether the first DRX configuration is in use.

In an example, the observing comprises measuring and assigning a congestion level to the first DRX ON duration of the first DRX configuration based on the observed activity of the resource pool.

In an example, the observed activity comprises one of: an energy measurement of the resource pool, and a decoding of sidelink control information associated with the first DRX ON duration.

In an example, the method comprises: comparing the congestion level of the first DRX ON duration of the first DRX configuration to a threshold value; and in response to determining that the congestion level of the first DRX ON duration of the first DRX configuration is above the threshold value, identifying the first DRX ON duration of the first DRX configuration as congested.

In an example, the method comprises: in response to determining that the first DRX ON duration of the first DRX configuration is congested, determining whether a preferred DRX ON duration of the preferred DRX configuration coincides with the first ON duration; and in response to determining that they do not coincide, selecting the preferred DRX configuration as the DRX configuration for the second terminal.

In an example, the method comprises: in response to determining that they do coincide, determining a DRX configuration different to the preferred DRX configuration based on the acquired information.

In an example, the DRX configuration different to the preferred DRX configuration is determined to avoid congested periods by other DRX ON periods. The other DRX ON periods may be from other devices and cast types (e.g., groupcast/broadcast).

In an example, the method comprises: in response to determining that they do coincide and the first DRX ON duration is congested, comparing the congestion level of the first DRX ON duration of the first DRX configuration to a tolerance threshold value; in response to determining that the first DRX ON duration of the first DRX configuration is below the threshold, selecting the preferred DRX configuration as the DRX configuration for the second terminal.

In an example, the first DRX configuration comprises a plurality of different DRX configurations that are each configured for use by one of: the first terminal, and a further terminal in the vicinity of the first terminal, wherein each of the plurality of different DRX configurations have a respective DRX ON duration.

In an example, the method comprises: in response to determining that i) each of the plurality of different DRX configurations coincide with the preferred DRX configuration and ii) that each of the respective DRX ON durations are congested, incrementing the threshold value by a step value; and comparing the congestion level of each of the respective DRX ON durations to the incremented threshold value, to determine a suitable DRX ON period, of the plurality of different DRX configurations, that has a congestion level below the incremented threshold value.

According to an aspect, there is provided a method performed by a second terminal, the method comprising: determining a preferred DRX configuration for the second terminal using DRX information acquired by the second terminal; providing assistance information indicating the determined DRX configuration to a first terminal; and receiving, from the first terminal, a DRX configuration for the second terminal to be applied on a unicast link between the first and second terminals.

In an example, the method comprises: using the received DRX configuration for unicast communications with the first terminal.

In an example, the acquired DRX information comprises: information about a second DRX configuration that is configured for use by one of: the second terminal, and a further terminal in the vicinity of the second terminal, wherein second DRX configuration has a second DRX ON duration.

In an example, the second DRX configuration is associated with a cast type, the cast type comprising one of: unicast, groupcast, and broadcast.

In an example, when the cast type of the second DRX configuration is broadcast or groupcast: the DRX information is acquired by received system information block signalling when the second terminal is in-network coverage, and the DRX information is acquired by a pre-configuration of the second terminal when the second terminal is out-of-network coverage.

In an example, the method comprises: observing activity of a resource pool associated with the second DRX configuration in order to determine whether the second DRX configuration is in use.

In an example, the observing comprises: measuring and assigning a congestion level to the second DRX ON duration of the second DRX configuration based on the observed activity of the resource pool.

In an example, the method comprises: comparing the congestion level of the second DRX ON duration of the second DRX configuration to a threshold value; and when the congestion level of the second DRX ON duration of the second DRX configuration is below the threshold value, identifying the second DRX ON duration as a suitable DRX ON duration for the preferred DRX configuration.

In an example, the second DRX configuration comprises a plurality of different DRX configurations, wherein the means are configured to perform: comparing the congestion level of each respective DRX ON durations of the plurality of different DRX configurations to a threshold value; and when the congestion level of one or more of the respective DRX ON duration of the plurality of different DRX configurations is below the threshold value, identifying the one or more respective DRX ON durations as suitable DRX active periods for the preferred DRX configuration.

In an example, the congestion level of all of the respective DRX ON durations of the plurality of different DRX configurations is above the threshold, incrementing the threshold value by a step value; and comparing the congestion level of each respective DRX ON duration of the plurality of different DRX configurations to the incremented threshold value, to determine a suitable DRX ON period, of the plurality of different DRX configurations, that has a congestion level below the incremented threshold value.

In an example, the method comprises: identifying a plurality of preferred DRX configurations, wherein assistance information for each of the plurality of preferred DRX configurations is provided to the first terminal, in order of preference.

According to an aspect, there is provided an apparatus comprising: one or more processors, and memory storing instructions that, when executed by the one or more processors, cause the apparatus to perform: receiving, from a second terminal, assistance information for a preferred discontinuous reception, DRX, configuration for the second terminal; determining a DRX configuration for the second terminal using: the received assistance information, and other information acquired by a first terminal related to DRX operations of terminals other than the second terminal; and providing, to the second terminal, the determined DRX configuration for the second terminal to be applied on a unicast link between the first and second terminals.

In an example, the apparatus is caused to perform: using the determined DRX configuration for unicast communications with the second terminal.

In an example, the acquired other information comprises: information about a first DRX configuration that is configured for use by one of: the first terminal, and a further terminal in the vicinity of the first terminal, wherein first DRX configuration has a first DRX ON duration.

In an example, the first DRX configuration is associated with a cast type, the cast type comprising one of: unicast, groupcast, and broadcast.

In an example, when the cast type of the first DRX configuration is broadcast or groupcast: the other information is acquired via received system information block signalling when the first terminal is in-network coverage, and the other information is acquired via pre-configuration of the first terminal when the second terminal is out-of-network coverage.

In an example, the apparatus is caused to perform: observing activity of a resource pool associated with the first DRX configuration in order to determine whether the first DRX configuration is in use.

In an example, the observing comprises measuring and assigning a congestion level to the first DRX ON duration of the first DRX configuration based on the observed activity of the resource pool.

In an example, the observed activity comprises one of: an energy measurement of the resource pool, and a decoding of sidelink control information associated with the first DRX ON duration.

In an example, the apparatus is caused to perform: comparing the congestion level of the first DRX ON duration of the first DRX configuration to a threshold value; and in response to determining that the congestion level of the first DRX ON duration of the first DRX configuration is above the threshold value, identifying the first DRX ON duration of the first DRX configuration as congested.

In an example, the apparatus is caused to perform: in response to determining that the first DRX ON duration of the first DRX configuration is congested, determining whether a preferred DRX ON duration of the preferred DRX configuration coincides with the first ON duration; and in response to determining that they do not coincide, selecting the preferred DRX configuration as the DRX configuration for the second terminal.

In an example, the apparatus is caused to perform: in response to determining that they do coincide, determining a DRX configuration different to the preferred DRX configuration based on the acquired information.

In an example, the DRX configuration different to the preferred DRX configuration is determined to avoid congested periods by other DRX ON periods. The other DRX ON periods may be from other devices and cast types (e.g., groupcast/broadcast).

In an example, the apparatus is caused to perform: in response to determining that they do coincide and the first DRX ON duration is congested, comparing the congestion level of the first DRX ON duration of the first DRX configuration to a tolerance threshold value; in response to determining that the first DRX ON duration of the first DRX configuration is below the threshold, selecting the preferred DRX configuration as the DRX configuration for the second terminal.

In an example, the first DRX configuration comprises a plurality of different DRX configurations that are each configured for use by one of: the first terminal, and a further terminal in the vicinity of the first terminal, wherein each of the plurality of different DRX configurations have a respective DRX ON duration.

In an example, the apparatus is caused to perform: in response to determining that i) each of the plurality of different DRX configurations coincide with the preferred DRX configuration and ii) that each of the respective DRX ON durations are congested, incrementing the threshold value by a step value; and comparing the congestion level of each of the respective DRX ON durations to the incremented threshold value, to determine a suitable DRX ON period, of the plurality of different DRX configurations, that has a congestion level below the incremented threshold value.

According to an aspect, there is provided an apparatus comprising: one or more processors, and memory storing instructions that, when executed by the one or more processors, cause the apparatus to perform: determining a preferred DRX configuration for a second terminal using DRX information acquired by the second terminal; providing assistance information indicating the determined DRX configuration to a first terminal; and receiving, from the first terminal, a DRX configuration for the second terminal to be applied on a unicast link between the first and second terminals.

In an example, the apparatus is caused to perform: using the received DRX configuration for unicast communications with the first terminal.

In an example, the acquired DRX information comprises: information about a second DRX configuration that is configured for use by one of: the second terminal, and a further terminal in the vicinity of the second terminal, wherein second DRX configuration has a second DRX ON duration.

In an example, the second DRX configuration is associated with a cast type, the cast type comprising one of: unicast, groupcast, and broadcast.

In an example, when the cast type of the second DRX configuration is broadcast or groupcast: the DRX information is acquired by received system information block signalling when the second terminal is in-network coverage, and the DRX information is acquired by a pre-configuration of the second terminal when the second terminal is out-of-network coverage.

In an example, the apparatus is caused to perform: observing activity of a resource pool associated with the second DRX configuration in order to determine whether the second DRX configuration is in use.

In an example, the observing comprises: measuring and assigning a congestion level to the second DRX ON duration of the second DRX configuration based on the observed activity of the resource pool.

In an example, the apparatus is caused to perform: comparing the congestion level of the second DRX ON duration of the second DRX configuration to a threshold value; and when the congestion level of the second DRX ON duration of the second DRX configuration is below the threshold value, identifying the second DRX ON duration as a suitable DRX ON duration for the preferred DRX configuration.

In an example, the second DRX configuration comprises a plurality of different DRX configurations, wherein the means are configured to perform: comparing the congestion level of each respective DRX ON durations of the plurality of different DRX configurations to a threshold value; and when the congestion level of one or more of the respective DRX ON duration of the plurality of different DRX configurations is below the threshold value, identifying the one or more respective DRX ON durations as suitable DRX active periods for the preferred DRX configuration.

In an example, the congestion level of all of the respective DRX ON durations of the plurality of different DRX configurations is above the threshold, incrementing the threshold value by a step value; and comparing the congestion level of each respective DRX ON duration of the plurality of different DRX configurations to the incremented threshold value, to determine a suitable DRX ON period, of the plurality of different DRX configurations, that has a congestion level below the incremented threshold value.

In an example, the apparatus is caused to perform: identifying a plurality of preferred DRX configurations, wherein assistance information for each of the plurality of preferred DRX configurations is provided to the first terminal, in order of preference.

According to an aspect, there is provided a computer program comprising computer executable instructions which when run on one or more processors perform: receiving, from a second terminal, assistance information for a preferred discontinuous reception, DRX, configuration for the second terminal; determining a DRX configuration for the second terminal using: the received assistance information, and other information acquired by a first terminal related to DRX operations of terminals other than the second terminal; and providing, to the second terminal, the determined DRX configuration for the second terminal to be applied on a unicast link between the first and second terminals.

According to an aspect, there is provided a computer program comprising computer executable instructions which when run on one or more processors perform: determining a preferred DRX configuration for a second terminal using DRX information acquired by the second terminal; providing assistance information indicating the determined DRX configuration to a first terminal; and receiving, from the first terminal, a DRX configuration for the second terminal to be applied on a unicast link between the first and second terminals.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

List of abbreviations

AF: Application Function
AMF: Access Management Function
AN: Access Network
BS: Base Station
CBR: Channel Busy Ratio
CDT: Congestion Determination Threshold
CN: Core Network
DL: Downlink
DRX: Discontinuous Reception
eNB: eNodeB
gNB: gNodeB
HARQ: Hybrid Automatic Repeat Request
IE: Information Element
IIoT: Industrial Internet of Things
LTE: Long Term Evolution
MSRP: Multicast Stream Reservation Protocol
NACK: Negative Acknowledgement
NEF: Network Exposure Function
NG-RAN: Next Generation Radio Access Network
NF: Network Function
NR: New Radio
NRF: Network Repository Function
NW: Network
MS: Mobile Station
PCF: Policy Control Function
PDB: Packet Delay Budget
PLMN: Public Land Mobile Network
RAN: Radio Access Network
RF: Radio Frequency
Rx UE: Receiver User Equipment
SCI: Sidelink Control Information
SIB: System Information Block
SL: Sidelink
SMF: Session Management Function
Tx UE: Transmission User Equipment
UE: User Equipment
UDR: Unified Data Repository
UDM: Unified Data Management
UL: Uplink
UPF: User Plane Function
V2X: Vehicle-to-Anything
VRU: Vulnerable Road User
3GPP: 3$^{rd}$ Generation Partnership Project
5G: 5$^{th}$ Generation
5GC: 5G Core network
5G-AN: 5G Radio Access Network
5GS: 5G System

BRIEF DESCRIPTION OF FIGURES

Embodiments will now be described, by way of example only, with reference to the accompanying Figures in which.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
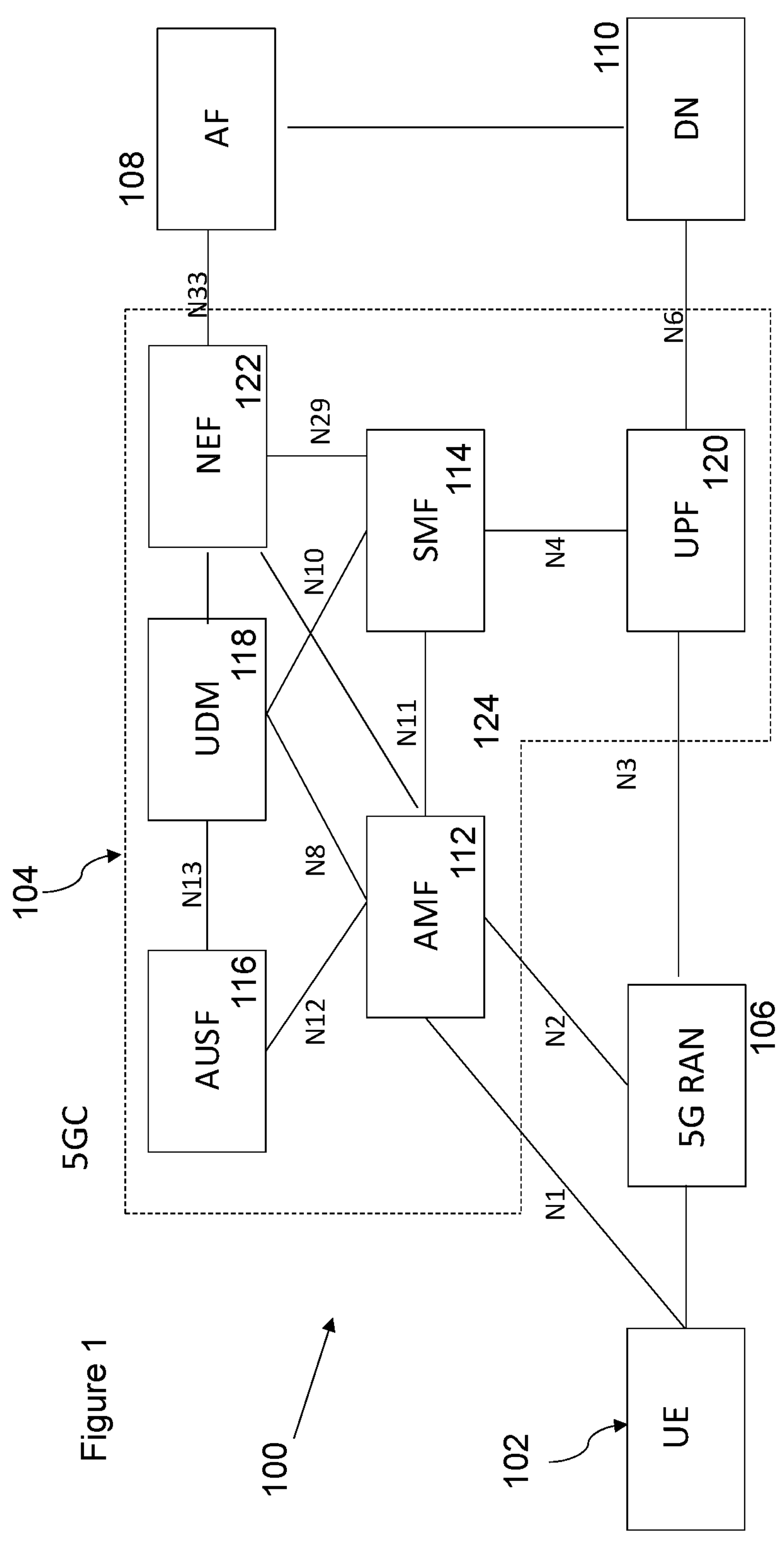
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of the disclosure, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS) 100. The 5GS may comprises a device 102 such as user equipment or terminal, a 5G access network (5G-AN) 106, a 5G core network (5GC) 104, one or more network functions (NF), one or more application function (AF) 108 and one or more data networks (DN) 110.

The 5G-AN 106 may comprise one or more gNodeB (gNB) distributed unit functions connected to one or more gNodeB (gNB) centralized unit functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122 and/or other NFs. Some of the examples as shown below may be applicable to 3GPP 5G standards. However, some examples may also be applicable to 4G, 3G and other 3GPP standards.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

Figure 2:
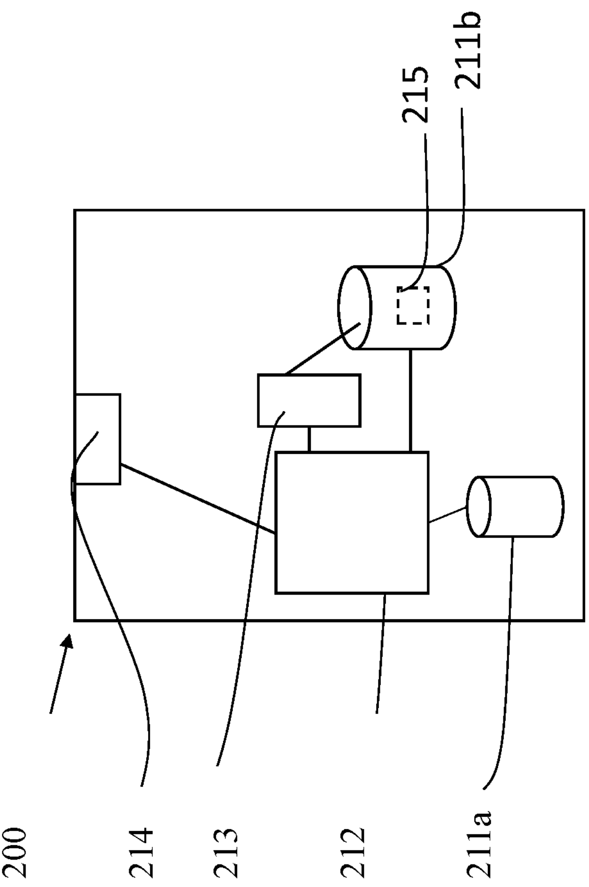
FIG. 2 shows a schematic representation of a control apparatus.

FIG. 2 illustrates an example of a control apparatus 200 for controlling a function of the 5G-AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G-AN or the 5GC. In some examples, each function of the 5G-AN or the 5GC comprises a control apparatus 200. In alternative examples, two or more functions of the 5G-AN or the 5GC may share a control apparatus.

Figure 3:
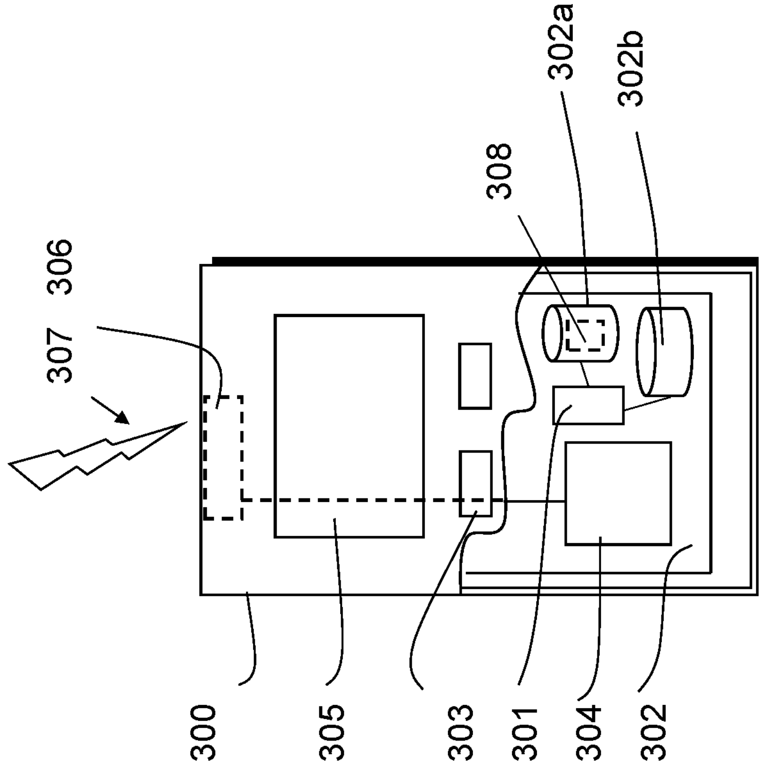
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*a* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus may be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Some of the following examples are related to sidelink communications. Sidelink communication allows devices to connect directly to one another and communicate. The devices may be, for example, UEs or terminals. Sidelink allows cellular devices to communicate with each other without relaying any of their data to the network. An 'ad hoc' network can therefore be created without the need of a network. Sidelink communications can occur using different types of casting. For example, unicast, broadcast and groupcast.

With a unicast connection, a device delivers a message to a single device using a one-to-one association between the sender and the destination. With a broadcast connection, a device delivers a message to all devices in the network using a one-to-all association. Groupcast delivers a message to a group of nodes that may have expressed interest in receiving the message using a one-to-many-of-many or many-to-many-of-many association(s). Groupcast is different in comparison to broadcast in that the destination address designates a subset of the accessible devices. Some of the following examples are relevant to unicast, broadcast and groupcast.

It has been identified that reducing energy usage in devices such as UEs and terminals is important. Sidelink in NR is designed with the assumption of "always-on" when the UE operates sidelink, which can use lots of power in devices. Therefore, in devices with power constraints such as for vulnerable road users (VRUs) in vehicle-to-anything (V2X) communications, or for UEs in a public safety and/or commercial use cases, power consumption needs to be minimized.

One or more of the following examples propose enhancements related to discontinuous reception (DRX) operations in sidelink (SL) communications. DRX is a communication method which can be used in communications to conserve the battery of devices (i.e., reduce power use). A device can be configured with time phases in which data transfer occurs. This time period is referred to as an ON duration/period, or an active period. During other times the device turns its receiver off and enters a low power state. This time period is referred to as an OFF duration/period, or an inactive period.

One or more of the example enhancements may reduce UE energy consumption and/or increase the applicability of SL communication to power-constrained devices, such as for example, VRU and wider use cases such as public safety, entertainment and other commercial applications. This will be discussed in more detail below.

Figure 4:
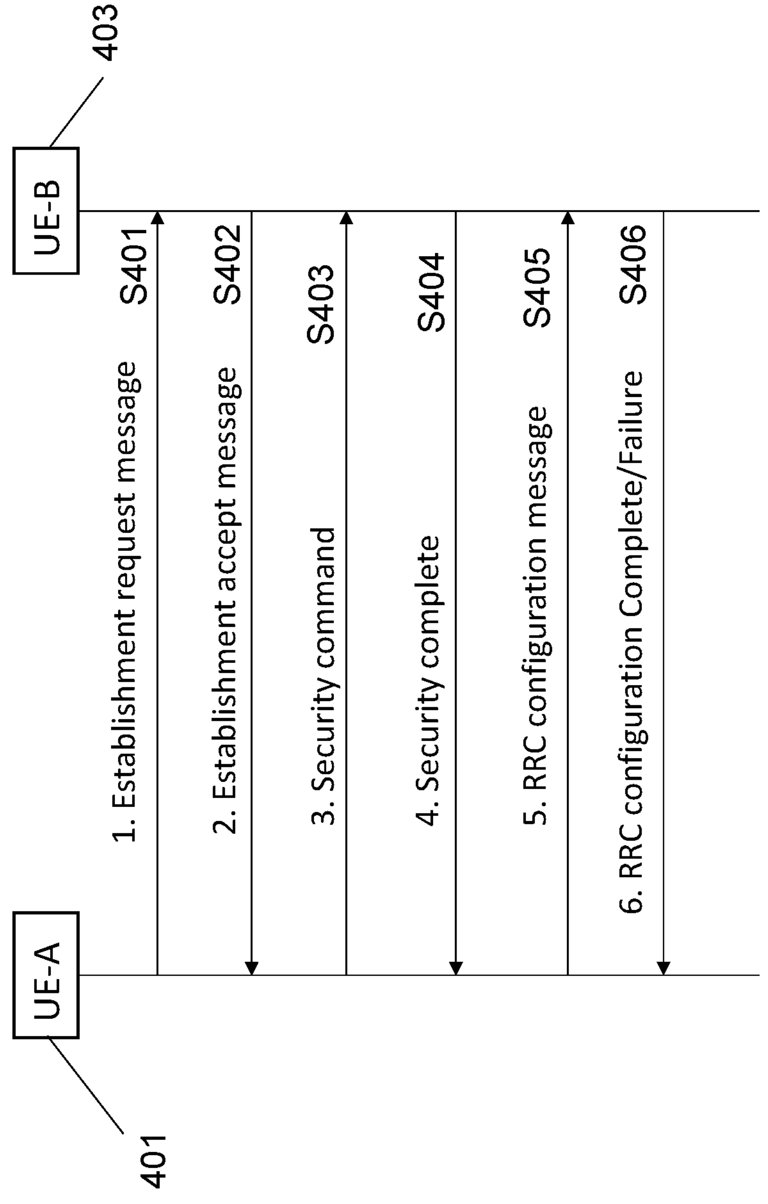
FIG. 4 shows an example signalling diagram between a first UE and a second UE in order to establish an SL unicast link.

FIG. 4 shows an example signalling diagram between a first UE 401 (UE-A) and a second UE 403 (UE-B), in order to establish an SL unicast link.

In S401, the UE-A 401 provides an establishment request message to the UE-B 403. The establishment request message may be a direct link establishment request message.

In S402, the UE-B 403 provides an establishment accept message to the UE-A 401. The establishment accept message may be a direct link establishment accept message.

In S403, the UE-A 401 provides a security command message to the UE-B 403. The security command message may be a direct link security mode command message.

In S404, the UE-B 403 provides a security complete message to the UE-A 401. The security complete message may be a direct link security mode complete message.

In S405, the UE-A 401 provides a radio resource control (RRC) configuration message to the UE-B 403. The RRC configuration message may be an RRCReconfigurationSidelink message.

In S406, the UE-B 403 provides an RRC configuration complete or RRC configuration failure message. The RRC configuration complete/failure message may be an RRCReconfigurationCompleteSidelink or RRCReconfigurationFailureSidelink message. It should be understood that other suitable message types may be used in other examples.

Following the signalling between UE-A 401 and UE-B 403, if the RRC message indicates a success, then there will be a unicast link established between the UE-A 401 and UE-B 403.

The use of the DRX feature in the SL design enables SL communications to be applicable to power-constrained devices. DRX restricts the period of time that a device needs to actively monitor a SL resource pool, such that the UE only monitors during a DRX active/DRX ON duration. This implies that for any transmission towards a SL receiving UE, under DRX, to be successfully received it needs to take place during the DRX ON duration of the intended receiver. An unintended consequence of this effect is that if multiple SL receiving UEs share the same the DRX ON durations, then all transmissions towards those same SL receiving UEs will occur during the same time period and therefore increases the likelihood of congestion to occur. An example of this is shown in FIG. 5.

Figure 5:
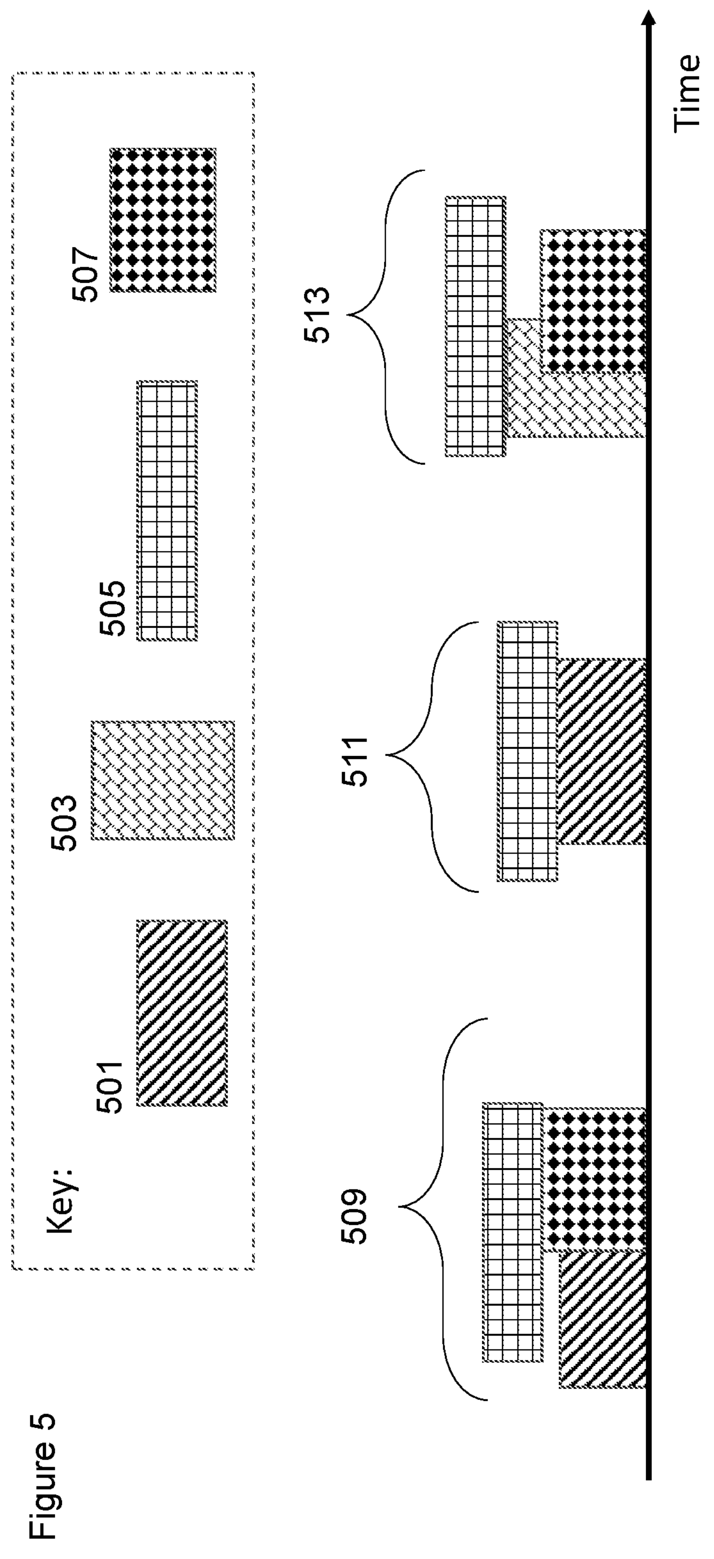
FIG. 5 shows a schematic example of a plurality of DRX ON durations for different cast types, with respect to time.

FIG. 5 shows a schematic example of a plurality of DRX ON durations for different cast types, with respect to time. FIG. 5 is shown from the perspective of a UE (or terminal) that may be receiving (or transmitting) a unicast SL communication.

The different shaded boxes represent different cast types. As seen in FIG. 5, a first box 501 (diagonally shaded patterned box) represents a DRX ON duration for a broadcast configuration. A second box 503 (brickwork patterned box) represents a DRX ON duration for a groupcast configuration. A third box 505 (squared patterned box) represents a DRX ON duration for a unicast configuration for other UEs in the vicinity of the UE. A fourth box 507 (chessboard patterned box) represents a DRX ON duration for a unicast configuration of the UE. It should be understood that in the context, vicinity, may mean: in the same cell as the UE, within a predefined distance of the UE, a region within which a UE transmitting sidelink communications is likely to impact sidelink communications of the UE, or in the service area as the UE.

As seen in FIG. 5, many of the time periods associated with the different DRX ON duration occur during the same time. Therefore, in time segments 509, 511, 513 there may be potential congestion. There may be congestion as there may be multiple transmissions/receptions in the same time period. This may reduce the efficiency of transmissions, and lead to failures.

The DRX ON duration of the UE's own unicast configuration is found in time segment 509, 511, but these time segments are shared with the unicast configurations of the other UEs. This may lead to congestion. Where the DRX ON duration associated with the UE's unicast communications overlaps with the broadcast and/or groupcast DRX ON duration, the UE becomes susceptible to congestion due to either broadcast or groupcast.

In some systems, groupcast and broadcast will have a common DRX configuration, including common DRX ON duration. This means that during the groupcast/broadcast DRX ON duration, the higher is the density of UEs in an area performing groupcast/broadcast the worse the congestion will be. The introduction of multiple sets of groupcast and broadcast DRX configurations may mitigate congestion, however since a UE needs to monitor broadcast transmissions and be potentially part of multiple groupcast groups then it is expected that the number of defined DRX cycle configurations will be small, in order to ensure that the amount of UE active time is minimized.

In contrast to groupcast/broadcast, for SL unicast transmissions the SL DRX configuration may be configured per pair of source/destination. In SL unicast, for a DRX configuration of each direction where one UE as Tx-UE and the other UE as Rx-UE, there will be a support signalling exchange including both signalling from the Rx-UE to the Tx-UE, and signalling from the Tx-UE to the Rx-UE. For SL unicast, a Tx-UE centric DRX configuration based on assistance information from the RX-UE may be used to determine a DRX configuration for the Rx-UE.

The groupcast and broadcast DRX ON durations will either be provided by the network or as part of pre-configuration, while the unicast DRX ON periods will be agreed between communicating peers. As there is not a single configuration entity responsible for the DRX ON duration configuration for the different cast types and coverage conditions, then it is likely that congestion conditions will emerge due to the non-intended overlapping of the different DRX ON durations. Furthermore, in in-coverage scenarios, different UEs can belong to different operators and it is not certain that different operators will have the same DRX configuration for broadcast/unicast.

One or more of the following examples aim to address one or more of the problems identified above.

In examples, there is a UE-based procedure that allows unicast devices to identify broadcast, groupcast and unicast DRX ON periods used by the UE and/or other peer UEs. The UE can use this information from the unicast UE peers to be able to configure the DRX ON durations that avoid the currently used DRX ON durations, as illustrated in FIG. 5. This mechanism can be utilized by a Tx UE (and a Rx UE) to avoid selecting resources for its SL transmission at least at the beginning of some detected ON durations of SL groupcasts in its proximity.

Figure 6:
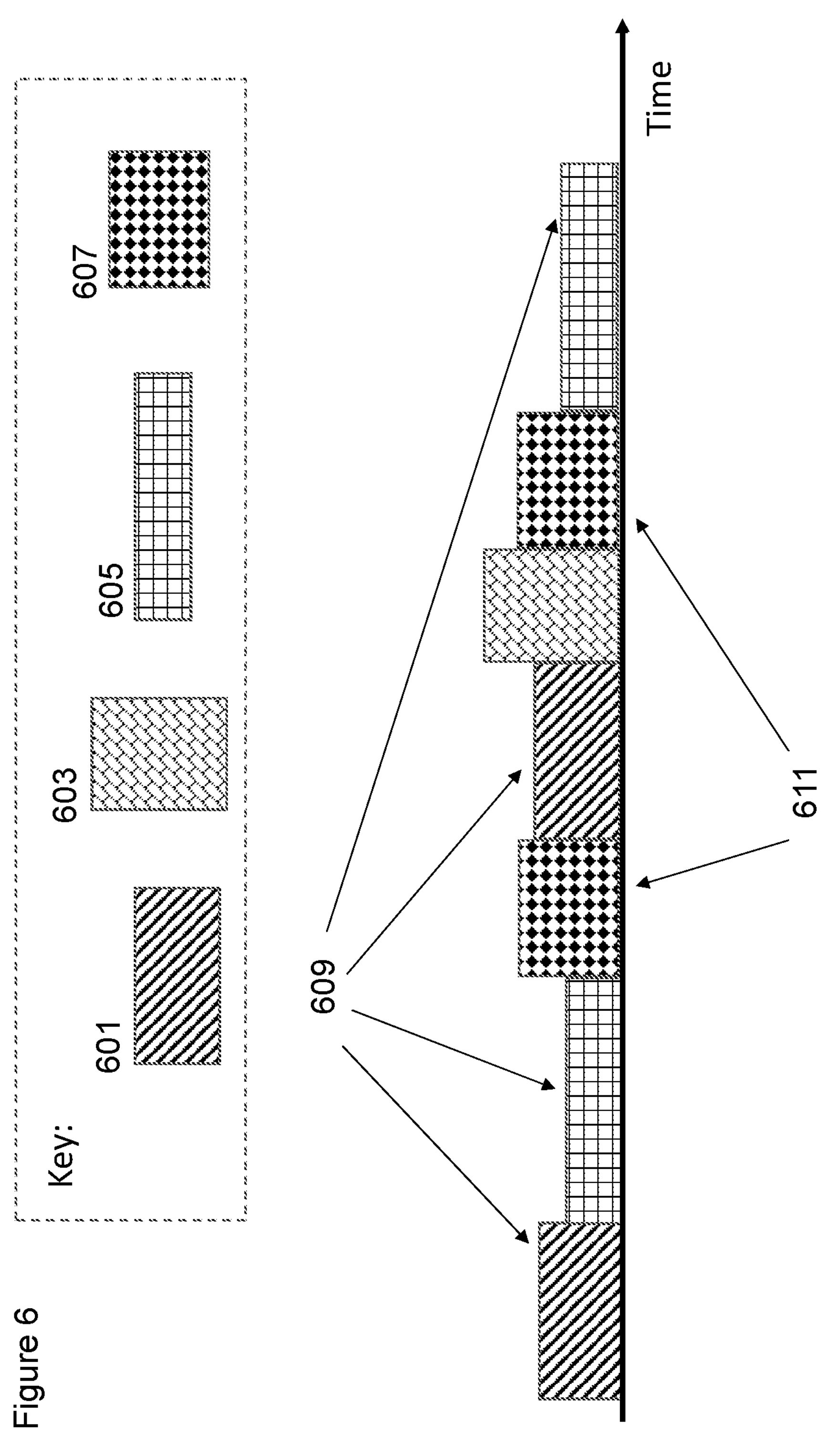
FIG. 6 shows a schematic example of UE detecting a plurality of different DRX ON durations.

FIG. 6 shows a schematic example of UE detecting a plurality of different DRX ON durations. The different shaded boxes represent different cast types. As seen in FIG.

6, a first box 601 (diagonally shaded patterned box) represents a DRX ON duration for a broadcast configuration. A second box 603 (brickwork patterned box) represents a DRX ON duration for a groupcast configuration. A third box 605 (squared patterned box) represents a DRX ON duration for a unicast configuration for other UEs in the vicinity of the UE. A fourth box 607 (chessboard patterned box) represents a DRX ON duration for a unicast configuration of the UE.

In time periods 609, for broadcast and groupcast configurations, the UE will be able to detect the DRX ON durations via acquired SIB configurations and/or direct sensing of the resource pool. In time periods 611, for unicast configurations of other UEs, the UE will be able to detect the DRX ON durations by direct sensing of the resource pool. In response to this, the UE may use these detected DRX ON durations when determining the UE's own DRX configuration, in order to minimise potential congestion. This will be described in more detail below alongside FIG. 7.

Figure 7:
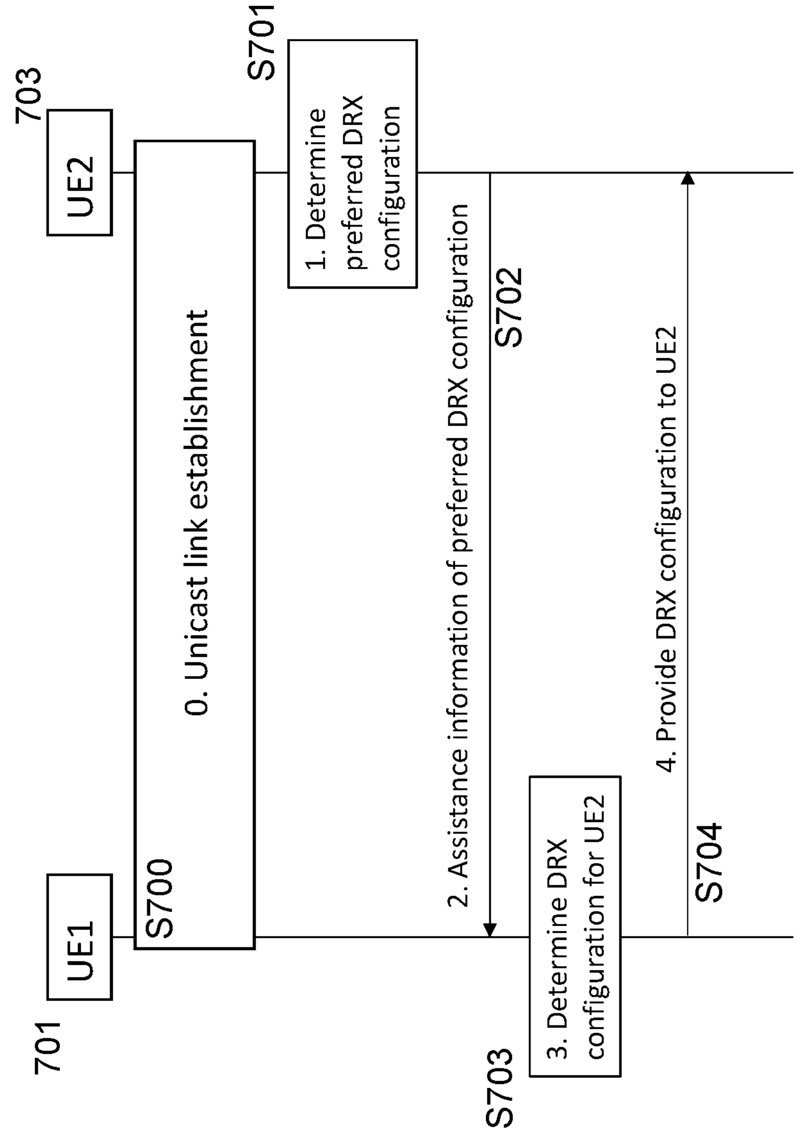
FIG. 7 shows an example signalling diagram between a first UE and a second UE.

FIG. 7 shows an example signalling diagram between a first UE 701 (UE1) and a second UE 703 (UE2). In this example, UE1 701 is a Tx UE, while UE2 703 is a Rx UE. It should be understood that both UE1 701 and UE2 703 could function as both Tx and Rx devices.

In S700, UE1 701 and UE2 703 exchange information in order to establish a unicast link between the UE1 701 and UE2 703. In examples, the information may comprise PC5-S and PC5-RRC signalling.

In S701, the UE2 703 determines a preferred DRX configuration to be used by the UE2 703. In some examples, the UE2 703 may determine the preferred DRX configuration based on at least one of: the UE2's 703 pre-existing DRX configurations, and information obtained regarding the common DRX ON periods of the groupcast, broadcast and unicast of other UEs in the UE2 703 vicinity. This allows the UE2 703 to suggest for its DRX ON duration a set of contiguous slots which preferentially are not being used either for groupcast or broadcast services that the UE is not monitoring (or not subscribing) as well as where it is not observed congestion from other unicast links.

In S702, the UE2 703 provides assistance information for the preferred DRX configuration to the UE1 701. In some examples, the assistance information is provided via a PC5-RRC message or medium access control control element (MAC CE).

In S703, the UE1 701 determines a DRX configuration for the UE2 703. The UE1 701 may use the received assistance information in order to determine the DRX configuration for UE2 703. The UE1 701 may use preferences of the UE1 701 in order to determine the DRX configuration for the UE2 703. UE1 701 may determine the DRX configuration for the UE2 703 in order to avoid congested time periods from other DRX ON periods from other devices and cast types (e.g., unicast/groupcast/broadcast). In S703, the UE1 may be determining an optimal DRX configuration, by taking into account other relevant DRX configurations currently in use. The optimal DRX configuration may be a DRX configuration with a DRX ON duration with the least congestion possible, taking into account the other relevant DRX configurations.

In some examples, the UE1 701 determines the DRX configuration to be applied, based on both the received assistance information, and the UE1's 701 own monitoring of the channel occupation of the groupcast, broadcast and other unicast transmissions in its vicinity. The UE1's 701 own monitoring may include DRX configurations of all other devices (UEs/terminals) in the vicinity, other than UE2 703. In an example, a transmission in the vicinity of the UE1 701 is meant to be any transmissions performed by other UEs nearby UE1 701 which can cause interference to the UE1 701 transmission, when being received at the intended receiver (i.e., UE2 703).

If the preferred DRX configuration(s) indicated by UE2 703 does not coincide with time periods that are deemed by UE1 701 as too congested, then the preferred DRX configuration indicated by UE2 703 is followed.

Alternatively, in a case whereby the UE2 703 indicated preferred DRX configuration correspond to time periods where there is too much congestion, then the UE1 701 determines a DRX configuration that avoids the congested time period. The determined DRX configuration may be based on UE1's own information obtained regarding the common DRX ON periods of the groupcast, broadcast and unicast of other UEs in the UE1 vicinity.

In S704, in response to the UE1 701 determining the DRX configuration, the UE1 provides the DRX configuration for the UE2 703, to the UE2 703. The DRX configuration for the UE2 703 may be provided in a PC5-RRC message. For example, an RRCReconfigurationSidelink message. It should be understood that other suitable message types may be used in other examples.

Once the determined DRX configuration has been provided to UE2 703, both the UE1 701 and UE2 703 can use the DRX configuration for future unicast communications between the devices.

In some examples, the UE2 703 will perform a number of steps in order to determine the preferred DRX configuration, as part of S701. The acquisition of the DRX ON durations associated with each cast type present in the vicinity of the UE2 703 may be performed in three stages.

In a first stage, the UE2 703 acquires information about any groupcast and/or broadcast common DRX configurations, in an attempt to identify these the DRX ON durations for these cast types. In examples, the acquisition includes retrieving information about the sl-drx-onDurationTimer and the sl-DRXInactivityTimer and sl-drx-Retransmission Timer for the DRX configurations. The sl-DRXInactivity-Timer and sl-drx-Retransmission Timer are only associated with groupcast and indicate how much more time after the DRX ON duration will potentially be used for groupcast retransmissions. The more congested the DRX ON duration is, the more likely it will be that the time corresponding to the sl-DRXInactivityTimer and the sl-drx-Retransmission-Timer after the DRX ON duration will be also congested. These identified time periods are shown in FIG. 8.

Figure 8:
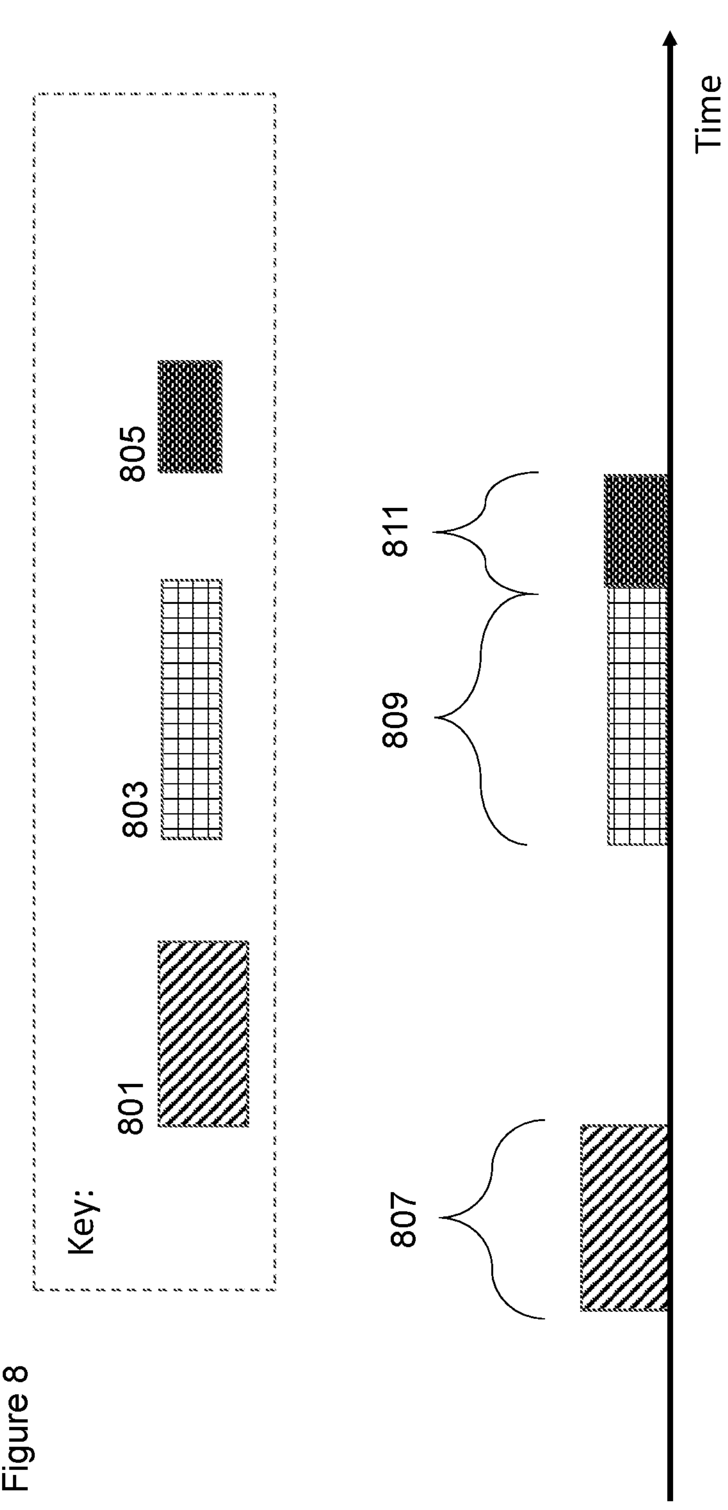
FIG. 8 shows a schematic example of identified discontinuous reception ON durations for broadcast and groupcast configurations, with respect to time.

FIG. 8 shows a schematic example of identified DRX ON durations for broadcast and groupcast configurations, with respect to time. The different shaded boxes represent different cast types. As seen in FIG. 8, a first box 801 (diagonally shaded patterned box) represents an identified DRX ON duration for a broadcast configuration. A second box 803 (brickwork patterned box) represents an identified DRX ON duration for a groupcast configuration. A third box 805 (dark shaded patterned box) represents an identified groupcast inactivity/retransmission time duration. In examples, the identified groupcast inactivity/retransmission time duration is dynamic.

The sources of information for the DRX ON durations of the broadcast and/or groupcast configurations may be obtained from system information block (SIB) signalling while the UE2 703 is in-network coverage. While the UE2 703 is out-of-coverage the UE2 703 may obtain the information for the DRX ON durations of the broadcast and/or groupcast configurations from the UE2's pre-configuration.

The pre-configuration information for groupcast and broadcast may be a suitable information source when all device vendors use the same pre-configured information. In examples when the network operators do not use the same DRX configuration for groupcast and broadcast, the UE may have to receive the SIBs from one or more network operators in its vicinity of UE2 703. In some situations, the UE2 703 can be in out-of-coverage from its network, but in coverage of a further NW. The UE2 703 may not be subscribed to the further NW. In these situations, the UE can extract the DRX configuration information from both the pre-configuration and the further NW SIB signalling.

In a second stage, the UE2 703 may check if the identified broadcast and/or groupcast ON durations are in use. The UE2 703 may observe the activity in the resource pool during those ON duration time periods in order to determine whether they are in use. For example, the observation may be based on received sidelink control information (SCI) and/or channel busy ratio (CBR) measurements. The observation of the resource pool may be triggered by a completion of the first stage as described above. In other examples, the observation of the resource pool may be triggered based on the UE's past observations of the resource pool. As part of the second stage, in some examples, the UE assigns to each observed ON duration, a congestion level. Each identified ON duration may be referred to as a (time) slot. In this way, each slot may be assigned a CBR (a slot level CBR).

For the groupcast and/or broadcast DRX ON durations, the direct sensing of the resource pool may be used to determine which DRX ON durations indicated by the NW or pre-configuration are in use. There may be multiple sets of DRX configurations assigned for each groupcast and/or broadcast. Therefore, in some examples, an identified DRX ON duration for groupcast and/or broadcast may not be active or even congested. A determination of whether a particular DRX configuration set is active may be based on an inspection of the 2nd stage SCIs exchanged during that time period which indicate if it is a broadcast or groupcast. When the configuration is a groupcast, the group may be identified by a destination ID.

Additionally, in the second stage, the UE2 703 may also identify (i.e., monitors 1st and 2nd stage SCI) unicast DRX ON durations in DRX configurations used by other UEs in its vicinity. The UE2 703 may identify these DRX ON durations by keeping track of the exchanged L1 entities in the 2nd stage SCI. If there is a number of exchanges between SL UEs above a certain threshold, whereby the L1 source and the destination ID match, then the UE2 703 may determine that time duration as a unicast DRX ON duration. The 1st stage sidelink control information (SCI) contains physical layer information to be used for the decoding of the payload. The 2nd stage SCI contains additional information which may be used for one of a number of aspects, including, instructing the receiver who is the sender of the transmission, determining who is the intended receiver, determining how to perform hybrid automatic request (HARQ) feedback, as well as other aspects.

In some examples, the UE2 703 and other SL UEs may be configured to announce about its SL DRX configuration(s) and operation in its proximity. This may be performed via 2nd stage SCI, for example. In this example, the UE2 703 may use such announcement from the other SL DRX UEs in its proximity in order to identify currently used DRX ON durations.

It should be understood that the first and second stages, as performed by UE2 703 (the Rx UE), are equally applicable to be performed by UE1 701 (the Tx UE).

In a third stage, the UE2 703 may set a threshold value to a first value. The threshold may be, for example, a congestion determination threshold, (CDT). The CDT may be set to a starting value of, for example, 0.2 (CDT=0.2). In other examples, the starting value may be higher or lower than 0.2.

The UE2 703 may then compare each DRX ON duration (slot) to the CDT value. When the identified slots overlap in respect of time, the UE2 703 may combines/overlap the broadcast, groupcast and/or unicast identified DRX ON durations and compares each slot to the CDT.

The UE2 703 may then identify all of the contiguous time periods (contiguous slots) wherein the measured congestion level (CBR) is below CDT. The contiguous time period may therefore be a different time period compared to the individual DRX ON durations (i.e., it could be a combination, or a subtraction of the DRX ON durations).

The UE2 703 may then identify any contiguous time periods suitable for the UE2's own DRX configuration. This identification may include determination of a duration of the DRX ON duration and a periodic occurrence associated with the expected packet delay budget (PDB) of the unicast link traffic.

When at least one of the identified contiguous time periods matches the requirements of the UE2 703, then this time period may be selected by the UE2 to report as the preferred DRX configuration, as part of the assistance information. In some examples, the CDT utilized by the UE2 703 to derive the preferred DRX configuration is included as part of the DRX assistance information.

When none of the identified contiguous time periods matches the requirements of the UE2 703, the CDT is incremented by the UE2 703. The CDT may be incremented by a step value (CDT_Step). For example, the CDT may be incremented/increased by 0.05 (CDT_Step=0.05). In other examples, the step value may be higher or lower than 0.05. Once the CDT has been incremented the steps of the third stage above are repeated. These steps may be repeated as many times as necessary before a contiguous time periods matches the requirements of the UE2 703.

In summary, the first stage includes an identification of DRX ON durations configured for use by the UE, or nearby UEs. The second stage includes a determination of a congestion level for each of the identified DRX ON durations. The third stage includes comparing the congestion levels of the identified DRX ON durations to a threshold value. In this way, the UE can determine which DRX ON durations would be suitable for use by the UE, as a preferred DRX configuration.

In an example, if an Rx UE is already monitoring a certain broadcast/groupcast DRX ON duration and the observed congestion level is below a threshold, the RX UE may prefer those slots (fully or partially overlapping contiguous time periods) for the Rx UE's own preferred DRX configuration. This allows for aligning a unicast DRX ON duration with a DRX ON duration of a broadcast/groupcast at the Rx UE which may save power by reducing the amount of active time (ON duration) at the Rx UE. The Rx UE may be monitoring a certain broadcast/groupcast when the Rx UE is interested in the corresponding broadcast/groupcast service(s), or when it is an intended recipient.

In an example, if an Rx UE already has a unicast link established with other UEs with certain DRX ON durations and the observed congestion level is below a threshold, then the Rx UE may prefer to use those certain DRX ON durations (fully or partially overlapping contiguous time periods) for its preferred DRX configuration. This allows for aligning of a unicast DRX ON duration for a 'new' configuration with a DRX ON duration already used by the Rx UE, in order to save power by reducing the amount of active time at the Rx UE.

In an example, the Rx UE may provide more than one preferred DRX configurations when providing the DRX assistance information to the Tx UE. The preferred DRX configurations may be reported in the order of preference in some examples. The preference may be viewed in terms of number of time slots, 'X', in the preferred DRX configuration that overlaps with the time slots of DRX ON periods that Rx UE is already monitoring, wherein the observed congestion is below a certain threshold. Hence, the preference increases with 'X' since it reduces the amount of active time at the Rx UE. It some examples, the 'X' value may also be included in the DRX assistance information provided to the Tx UE.

In an example, the CDT threshold discussed above may vary for each of the identified broadcast/groupcast/unicast ON durations. The CDT thresholds may vary depending on whether or not the Rx UE is already monitoring (i.e., already has an overlapping DRX ON period) those periods. In an example, the Rx UE may add a CDT offset, for example, 0.01, to the CDT for each slot that it is already monitoring. This will create a bias in stage-three towards selecting time periods in which the Rx UE is already active to save power at Rx UE.

As discussed above, the first and second stages, as performed by UE2 703 (the Rx UE), are equally applicable to UE1 701 (the Tx UE). In some examples, the UE1 701 will identify one or more DRX ON durations configured for use by UE1, or other UEs (stage one). The UE1 will then determine a congestion level for each identified DRX ON duration (stage 2).

In some examples, the UE1 701 (Tx UE) receives the DRX assistance information (S702) from UE2 703 and then compares it with the UE1's own stage one and stage two information.

In some examples, a third stage procedure at the UE1 701 (Tx UE) includes the UE1 701 setting a threshold value to a first value. The threshold may be, for example, a congestion determination threshold, (CDT). The CDT may be set to a starting value of, for example, 0.2 (CDT=0.2). In other examples, the starting value may be higher or lower than 0.2.

The UE1 701 may then compare each DRX ON duration (slot) to the CDT value. When the identified slots overlap in respect of time, the UE1 701 may combines/overlap the broadcast, groupcast and/or unicast identified DRX ON durations and compares each slot to the CDT.

The UE1 701 may then identify all of the contiguous time periods (contiguous slots) wherein the measured congestion level (CBR) is below CDT. The contiguous time period may therefore be a different time period compared to the individual DRX ON durations (i.e., it could be a combination, or a subtraction of the DRX ON durations).

If an ON duration provided in the UE2 assistance information matches at least one of the suitable time periods identified by UE1, then this time period may be selected by the UE1 701 for the UE2 703 DRX configuration. This confirmed DRX configuration may then be provided to the UE2 703 as the preferred DRX configuration. In examples, the DRX configuration is provided via a PC5-RRC RRCReconfigurationSidelink message.

If the ON duration provided in the UE2 assistance information does not match at least one of the suitable time periods identified by UE1, then the UE1 701 will utilise a tolerance threshold. If a congestion level (CBR) of an identified time period is within a CBR tolerance threshold (e.g., 0.2) of the ON duration provided in the assistance information, then this time period is selected as the DRX configuration for UE2 703. The UE1 701 then provides the selected DRX configuration to the UE2 703. In examples, the DRX configuration is provided via a PC5-RRC RRCReconfigurationSidelink message. It should be understood that in other examples, the CBR tolerance threshold may be lower or higher than 0.2.

In some examples, if the CDT utilized by UE2 703 is provided to UE1 701 as part of the DRX assistance information, then this may be used by UE1 701 when determining the DRX configuration. For example, if the (CDT—slot level CBR) CBR tolerance threshold, then this time period may be selected by the UE1 701 for DRX configuration.

When none of the identified contiguous time periods matches the requirements of the UE2 703, the CDT is incremented by UE1 701. The CDT may be incremented by a step value (CDT_Step). For example, the CDT may be incremented/increased by 0.05 (CDT_Step=0.05). In other examples, the step value may be higher or lower than 0.05. Once the CDT has been incremented the steps of the third stage above are repeated. These steps may be repeated as many times as necessary before a suitable DRX configuration is determined by UE1, for UE2.

In an example, when multiple DRX ON durations are provided in the Rx UE's DRX assistance information, and more than one are identified as suitable by the Tx UE, the Tx UE may select the time period that has the most overlap with the DRX ON period in which the Tx UE is already active. This allows the Tx UE to save the power by aligning its unicast DRX ON with its other active period(s).

In an example, when multiple DRX ON durations are reported by the Rx UE with an order preference, and more than one are identified as suitable by the Tx UE, the Tx UE may select the time period that is most preferred at the Rx UE (i.e., highest order in the list of preference). This allows the Rx UE to save power.

In an example, the CDT threshold discussed above may vary for each of the identified broadcast/groupcast/unicast ON durations. The CDT thresholds may vary depending on whether or not the Tx UE already has an overlapping DRX ON period with those periods. In an example, the Tx UE may add a CDT offset, for example, 0.01, to the CDT for each slot which the TX UE is already active. This creates a bias in stage-three towards selecting time periods in which the Tx UE is already active to save power at Tx UE.

In an example, the CDT thresholds in stage-three may vary for the time periods preferred by the Rx UE. In an example, the Tx UE may add a CDT offset (e.g., 0.1) to the CDT for each slot that corresponds to preferred time period of the Rx UE. This creates a bias in stage-three towards selecting time periods that the Rx UE prefers. The CDT offset may also vary among the preferred time periods depending on the order of preference. The Tx UE may set higher CDT offset for the time periods that have higher preference at the Rx UE to create a larger bias.

One or more of the examples above have the advantage that they introduce a mechanism at the Rx and/or Tx UEs (terminals) for SL communications that enables the unicast links to avoid congested time periods when determining the associated DRX configuration. Avoiding the congested time periods allows the UEs to be active (DRX ON) for a shorter amount of time. This allows the devices (e.g., UE, terminal, etc.) to save power.

Figure 9:
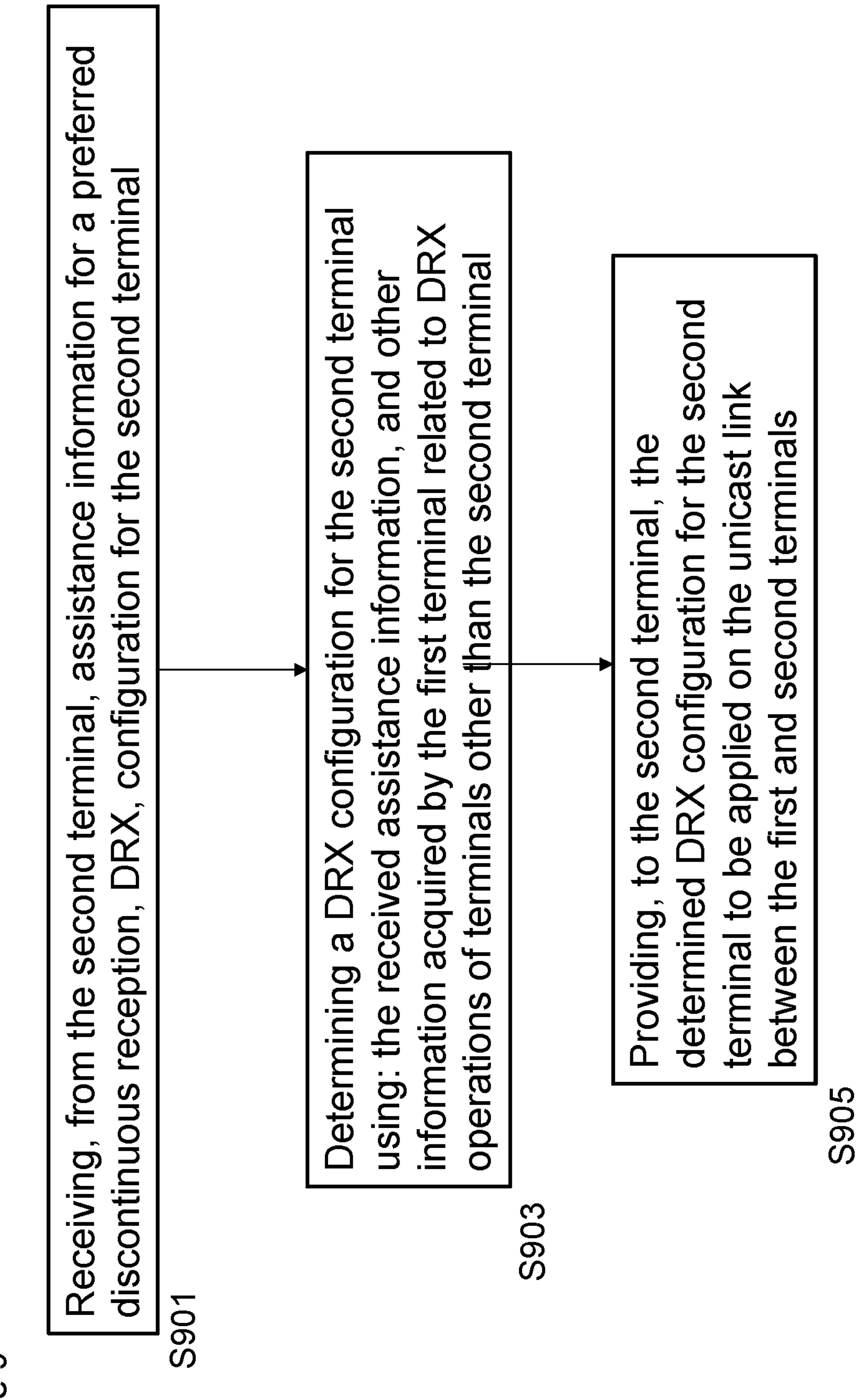
FIG. 9 shows an example method flow diagram performed by a first apparatus.

FIG. 9 shows an example method flow performed by an apparatus. The apparatus may be comprised within a terminal. In other examples, the apparatus may be comprised within a user device, such as a user equipment.

In S901, the method comprises receiving, from the second terminal, assistance information for a preferred discontinuous reception, DRX, configuration for the second terminal.

In S903, the method comprises determining a DRX configuration for the second terminal using: the received assistance information, and other information acquired by the first terminal related to DRX operations of terminals other than the second terminal.

In S905, the method comprises providing, to the second terminal, the determined DRX configuration for the second terminal to be applied on the unicast link between the first and second terminals.

Figure 10:
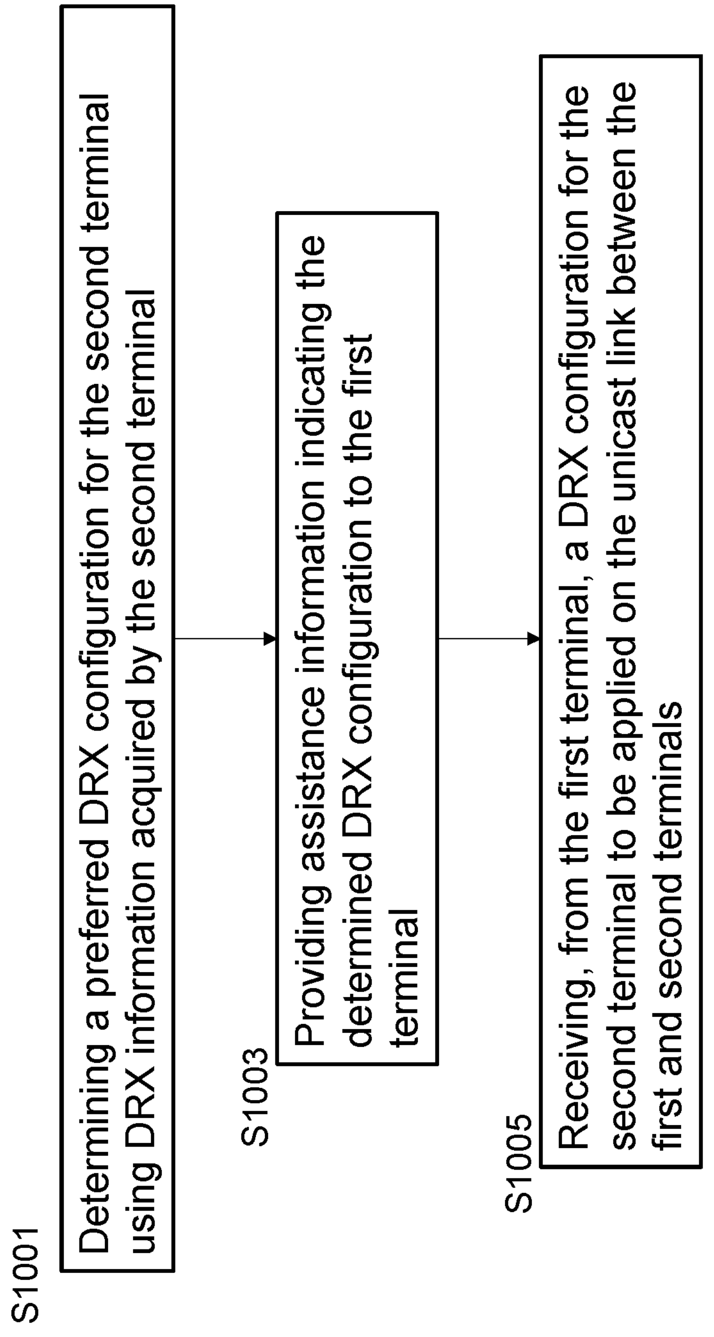
FIG. 10 shows another example method flow diagram performed by a second apparatus.

FIG. 10 shows an example method flow performed by an apparatus. The apparatus may be comprised within a terminal. In other examples, the apparatus may be comprised within a user device, such as a user equipment.

In S1001, the method comprises determining a preferred DRX configuration for the second terminal using DRX information acquired by the second terminal.

In S1003, the method comprises providing assistance information indicating the determined DRX configuration to the first terminal.

In S1005, the method comprises receiving, from the first terminal, a DRX configuration for the second terminal to be applied on the unicast link between the first and second terminals.

Figure 11:
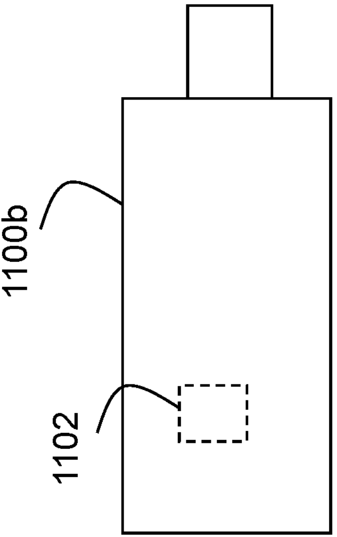
FIG. 11 shows a schematic representation of a non-volatile memory medium storing instructions which when executed by a processor allow a processor to perform one or more of the steps of the method of FIGS. 9 and 10.
Figure 11:
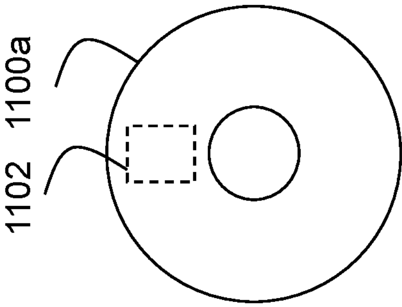

FIG. 11 shows a schematic representation of non-volatile memory media 1100*a* (e.g., computer disc (CD) or digital versatile disc (DVD)) and 1100*b* (e.g., universal serial bus (USB) memory stick) storing instructions and/or parameters 1102 which when executed by a processor allow the processor to perform one or more of the steps of the methods of FIG. 9 and FIG. 10.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A first apparatus for a first terminal, wherein the first terminal has a unicast link established with a second terminal, the first apparatus comprising:

at least one processor; and at least one memory including computer program code;

the at least one memory and the computer program code configured to, with the at least one processor, cause the first apparatus at least to:

receive, from the second terminal, assistance information for a preferred discontinuous reception, DRX, configuration for the second terminal;

determine a DRX configuration for the second terminal using: the received assistance information, and other information acquired by the first terminal related to DRX operations of terminals other than the second terminal;

provide, to the second terminal, the determined DRX configuration for the second terminal to be applied on the unicast link between the first and second terminals;

wherein the acquired other information comprises information about a first DRX configuration that is configured for use by the first terminal, and a further terminal in a vicinity of the first terminal, wherein the first DRX configuration has a first DRX ON duration;

observe activity of a resource pool associated with the first DRX configuration in order to determine whether the first DRX configuration is in use; and measure and assign a congestion level to the first DRX ON duration of the first DRX configuration based on the observed activity of the resource pool.

2. The first apparatus as claimed in claim 1, wherein the first DRX configuration is associated with a cast type, the cast type comprising one of: unicast, groupcast, and broadcast.

3. The first apparatus according to claim 2, wherein when the cast type of the first DRX configuration is broadcast or groupcast, the other information is acquired via received system information block signalling when the first terminal is in-network coverage, and the other information is acquired via pre-configuration of the first terminal when the second terminal is out-of-network coverage.

4. The first apparatus as claimed in claim 1, wherein the at least one processor and the computer program code are configured to cause the first apparatus to:

compare the congestion level of the first DRX ON duration of the first DRX configuration to a threshold value; and in response to determining that the congestion level of the first DRX ON duration of the first DRX configuration is above the threshold value, identify the first DRX ON duration of the first DRX configuration as congested.

5. The first apparatus as claimed in claim 4, wherein the at least one processor and the computer program code are configured to cause the first apparatus to:

in response to determining that the first DRX ON duration of the first DRX configuration is congested, determine whether a preferred DRX ON duration of the preferred DRX configuration coincides with the first ON duration; and in response to determining that they do not coincide, select the preferred DRX configuration as the DRX configuration for the second terminal.

6. The first apparatus as claimed in claim 5, wherein the at least one processor and the computer program code are configured to cause the first apparatus to:

in response to determining that they do coincide, determine a DRX configuration different to the preferred DRX configuration based on the acquired other information.

7. The first apparatus as claimed in claim 5, wherein the at least one processor and the computer program code are configured to cause the first apparatus to:

in response to determining that they do coincide and the first DRX ON duration is congested, compare the congestion level of the first DRX ON duration of the first DRX configuration to a tolerance threshold value;

in response to determining that the first DRX ON duration of the first DRX configuration is below the threshold, select the preferred DRX configuration as the DRX configuration for the second terminal.

8. A first apparatus for a first terminal, wherein the first terminal has a unicast link established with a second terminal, the first apparatus comprising:

at least one processor; and at least one memory including computer program code;

the at least one memory and the computer program code configured to, with the at least one processor, cause the first apparatus at least to:

receive, from the second terminal, assistance information for a preferred discontinuous reception, DRX, configuration for the second terminal;

determine a DRX configuration for the second terminal using: the received assistance information, and other information acquired by the first terminal related to DRX operations of terminals other than the second terminal;

provide, to the second terminal, the determined DRX configuration for the second terminal to be applied on the unicast link between the first and second terminals;

wherein the acquired other information comprises information about a first DRX configuration that is configured for use by the first terminal, and a further terminal in a vicinity of the first terminal, wherein the first DRX configuration has a first DRX ON duration;

wherein the first DRX configuration comprises a plurality of different DRX configurations that are each configured for use by the first terminal, and a further terminal in a vicinity of the first terminal, wherein each of the plurality of different DRX configurations have a respective DRX ON duration;

in response to determining that i) each of the plurality of different DRX configurations coincide with the preferred DRX configuration and ii) that each of the respective DRX ON durations are congested, increment a threshold value by a step value; and compare a congestion level of each of the respective DRX ON durations to the incremented threshold value, to determine a suitable DRX ON period, of the plurality of different DRX configurations, that has a congestion level below the incremented threshold value.

9. A second apparatus for a second terminal, wherein the second terminal has a unicast link established with a first terminal, the second apparatus comprising:

at least one processor; and at least one memory including computer program code;

the at least one memory and the computer program code configured to, with the at least one processor, cause the second apparatus at least to:

determine a preferred DRX configuration for the second terminal using DRX information acquired by the second terminal;

provide assistance information indicating the determined DRX configuration to the first terminal;

receive, from the first terminal, a DRX configuration for the second terminal to be applied on the unicast link between the first and second terminals;

wherein the acquired DRX information comprises: information about a second DRX configuration that is configured for use by the second terminal, and a further terminal in a vicinity of the second terminal, wherein second DRX configuration has a second DRX ON duration; and observe activity of a resource pool associated with the second DRX configuration in order to determine whether the second DRX configuration is in use, including measure and assign a congestion level to the second DRX ON duration of the second DRX configuration based on the observed activity of the resource pool.

10. The second apparatus as claimed in claim 9, wherein the at least one processor and the computer program code are configured to cause the second apparatus to:

compare the congestion level of the second DRX ON duration of the second DRX configuration to a threshold value; and when the congestion level of the second DRX ON duration of the second DRX configuration is below the threshold value, identify the second DRX ON duration as a suitable DRX ON duration for the preferred DRX configuration.

11. The second apparatus as claimed in claim 9, wherein the second DRX configuration comprises a plurality of different DRX configurations, wherein the at least one processor and the computer program code are configured to cause the second apparatus to:

compare the congestion level of each respective DRX ON durations of the plurality of different DRX configurations to a threshold value; and when the congestion level of one or more of the respective DRX ON duration of the plurality of different DRX configurations is below the threshold value, identify the one or more respective DRX ON durations as suitable DRX active periods for the preferred DRX configuration.

* * * * *